United States Patent
Chen et al.

(10) Patent No.: US 10,117,258 B2
(45) Date of Patent: Oct. 30, 2018

(54) WIRELESS CHANNEL REDISTRIBUTION METHOD AND APPARATUS

(71) Applicant: BEIJING QIHOO TECHNOLOGY COMPANY LIMITED, Beijing (CN)

(72) Inventors: Jian Chen, Beijing (CN); Junhong Guo, Beijing (CN); Zhi Liu, Beijing (CN)

(73) Assignee: Beijing Qihoo Technology Comapny Limited, Beijing (CN)

( * ) Notice: Subject to any disclaimer, the term of this patent is extended or adjusted under 35 U.S.C. 154(b) by 190 days.

(21) Appl. No.: 15/038,428

(22) PCT Filed: Nov. 21, 2014

(86) PCT No.: PCT/CN2014/091844
§ 371 (c)(1),
(2) Date: May 20, 2016

(87) PCT Pub. No.: WO2015/074593
PCT Pub. Date: May 28, 2015

(65) Prior Publication Data
US 2016/0295598 A1    Oct. 6, 2016

(30) Foreign Application Priority Data

Nov. 22, 2013 (CN) .......................... 2013 1 0597831
Nov. 22, 2013 (CN) .......................... 2013 1 0597854

(51) Int. Cl.
*H04W 72/08* (2009.01)
*H04W 76/19* (2018.01)
(Continued)

(52) U.S. Cl.
CPC ......... *H04W 72/085* (2013.01); *H04W 52/14* (2013.01); *H04W 52/245* (2013.01);
(Continued)

(58) Field of Classification Search
None
See application file for complete search history.

(56) References Cited

U.S. PATENT DOCUMENTS

2002/0060995 A1* 5/2002 Cervello ............... H04W 72/02
                                                370/332
2002/0176437 A1* 11/2002 Busch ................... H04W 16/10
                                                370/437

(Continued)

FOREIGN PATENT DOCUMENTS

CN            1881917 A     12/2006
CN          101448312 A      6/2009
(Continued)

*Primary Examiner* — Joseph A Bednash
(74) *Attorney, Agent, or Firm* — Baker & Hostetler LLP

(57) ABSTRACT

Disclosed are wireless channel redistribution method and apparatus. The wireless channel redistribution method comprises: a wireless router receiving an optimum wireless channel selection command transmitted from a controller; the wireless router scanning channel quality of each wireless channel; the wireless router, according to the channel quality of each wireless channel obtained by scanning, selecting a current working channel of the wireless router; and the wireless router restarting a wireless connection module and implementing information exchange with a mobile device according to the current working channel.

20 Claims, 4 Drawing Sheets

(51) Int. Cl.
*H04W 52/14* (2009.01)
*H04W 52/24* (2009.01)
*H04W 72/04* (2009.01)
*H04W 84/12* (2009.01)

(52) U.S. Cl.
CPC ....... *H04W 72/0433* (2013.01); *H04W 76/19* (2018.02); *H04W 84/12* (2013.01)

(56) References Cited

U.S. PATENT DOCUMENTS

| | | | | |
|---|---|---|---|---|
| 2002/0181418 | A1* | 12/2002 | Awater | H04W 16/10 370/329 |
| 2005/0003865 | A1* | 1/2005 | Lastinger | H01Q 3/2605 455/562.1 |
| 2005/0171720 | A1* | 8/2005 | Olson | H04L 63/1433 702/121 |
| 2006/0013179 | A1* | 1/2006 | Yamane | H04W 72/02 370/338 |
| 2011/0032913 | A1 | 2/2011 | Patil et al. | |
| 2014/0036691 | A1* | 2/2014 | Madan | H04W 24/10 370/242 |

FOREIGN PATENT DOCUMENTS

| | | |
|---|---|---|
| CN | 102395174 A | 3/2012 |
| CN | 102457940 A | 5/2012 |
| CN | 102685210 A | 9/2012 |
| CN | 102781115 A | 11/2012 |
| CN | 102802161 A | 11/2012 |
| CN | 103313345 A | 9/2013 |
| CN | 103345827 A | 10/2013 |
| CN | 103415066 A | 11/2013 |
| CN | 103619058 A | 3/2014 |
| CN | 103619067 A | 3/2014 |
| WO | WO 2011/113394 A2 | 9/2011 |

* cited by examiner

WIRELESS CHANNEL REDISTRIBUTION METHOD AND APPARATUS

CROSS-REFERENCE TO RELATED APPLICATIONS

This application is the national stage of International Application No. PCT/CN2014/091844 filed Nov. 21, 2014, which is based upon and claims priority to Chinese Patent Application No. CN201310597831.7 and Chinese Patent Application No. CN201310597854.8, both filed Nov. 22, 2013, the entire contents of which are incorporated herein by reference.

FIELD OF TECHNOLOGY

The disclosure relates the field of network communication technologies, and in particular to wireless channel redistribution method and apparatus.

BACKGROUND

A wireless channel is a transmission media of a wireless signal. A current wireless router may perform wireless signal interaction with an intelligent terminal device, such as intelligent mobile phone, tablet and computer, via the wireless channel.

The wireless router may usually divide its radio spectrum (such as, 2.4 GHz) into a plurality of wireless channels, such as 11 or 13 wireless channels. And being powered on to activate, the wireless router may usually use one of wireless channels as a current working channel and perform the wireless signal interaction with the intelligent terminal device via the current working channel. The working channel of the wireless router could be selected and set by a user, or could be set to default settings by the wireless router.

The working channel of the wireless router usually suffers from disturbances to varying degrees. The disturbance sources thereof may include a nearby wireless router (for example, a wireless router of neighbor), a microwave oven, a Bluetooth module, a cordless telephone, a wireless mouse and a wireless headset, or even an air conditioning and a refrigerator, for example. When the working channel of the wireless router is under the external disturbance, network abnormities such as slow transmission rate of data packet, packet loss or even disconnection usually occur.

When the user notices the abnormity of wireless network, following measures would be normally taken: powering off the wireless router and then re-energizing the wireless router with a predefined time interval (such as a few or more than ten seconds) elapse.

The inventors have found in the implementation of the disclosure that, since the wireless router may still perform the wireless signal interaction with the intelligent terminal device via the original working channel after being re-energized, the network abnormities may not disappear after the wireless router is re-energized. In addition, since the user is required to manually perform the power on/off operation on the wireless router, the user experience of the wireless router is awaiting to be further improved.

SUMMARY

In the view of above problems, the disclosure is proposed to provide a wireless channel redistribution method, a corresponding wireless channel redistribution apparatus, computer program and computer readable medium for overcoming or at least partially solving above problems.

According to an aspect of the disclosure, there is provided a wireless channel redistribution method, comprising steps of: a wireless router receiving an optimum wireless channel selection command transmitted from a controller; the wireless router scanning channel quality of each wireless channel; the wireless router, according to the channel quality of each wireless channel obtained by scanning, selecting a current working channel of the wireless router; and the wireless router restarting a wireless connection module and implementing information exchange with a mobile device according to the current working channel.

According to another aspect of the disclosure, there is provided a wireless channel redistribution apparatus, wherein the apparatus substantially includes: a first receiving module, configured for the wireless router to receive an optimum wireless channel selection command transmitted from a controller; a scanning module, configured for the wireless router to scan channel quality of each wireless channel; a selecting module, configured for the wireless router to select a current working channel of the wireless router according to the channel quality of each wireless channel obtained by scanning; and a control module, configured for the wireless router to restart a wireless connection module thereof such that the wireless router implements information exchange with a mobile device according to the current working channel after the wireless connection module is restarted.

According to another aspect of the disclosure, there is provided a computer program, including computer readable codes, wherein the wireless channel redistribution method as described above is executed when the computer readable codes are carried out on an electronic device.

According to still another aspect of the disclosure, there is provided a computer readable medium, in which the computer program as described above is stored.

By sending the optimum wireless channel selection command to the wireless router, the wireless channel redistribution method and apparatus according to the disclosure may prompt the wireless router to scan the channel quality of each wireless channel. In such a manner, the wireless router may select the wireless channel having better or best channel quality as the current working channel thereof according the scanning result. Since the wireless router may implement the information exchange with the mobile device using the selected current working channel after the restart of the wireless connection module (for example, WiFi module), the wireless router may provide a better information exchange environment for the user, whereby preventing the network abnormities such as slow transmission rate of data packet, packet loss or even disconnection. Further, the user has no need to manually perform the power on/off operation on the wireless router. In the end, the disclosure can improve the working performance of the wireless router, and then improve the network experience for the user.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

BRIEF DESCRIPTION OF THE DRAWINGS

Through reading the detailed description of the following preferred embodiments, various other advantages and benefits will become apparent to an ordinary person skilled in the art. Accompanying drawings are merely included for the purpose of illustrating the preferred embodiments and should not be considered as limiting of the invention. Further, throughout the drawings, same elements are indicated by same reference numbers. In the drawings.

DESCRIPTION OF THE EMBODIMENTS

Exemplary embodiments of the disclosure will be described in detail with reference to the accompanying figures hereinafter. Although the exemplary embodiments of the disclosure are illustrated in the accompanying figures, it should be understood that the disclosure may be embodied in many different forms and should not be construed as being limited to the embodiments set forth herein. Rather, these embodiments are provided so that this disclosure will be understood thoroughly and completely and will fully convey the scope of the disclosure to those skilled in the art.

The first embodiment is directed to a wireless channel redistribution method. Hereinafter the method according to this embodiment will be described in detail with reference to FIG. 1.

Figure 1:
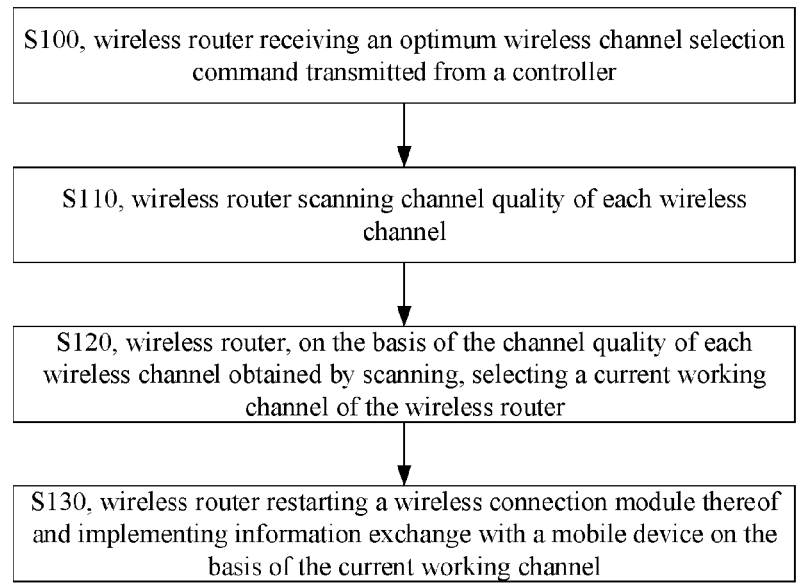
FIG. 1 illustrates a flow chart of a wireless channel redistribution method according to an embodiment of the disclosure.

In FIG. 1, S100, a wireless router receiving an optimum wireless channel selection command transmitted from a controller.

In particular, the wireless router in this embodiment corresponds to the controller which could be a terminal device capable of triggering the wireless router to redistribute the wireless channels thereof, such as a terminal device installed with a wireless router management application. The controller could specifically be an intelligent terminal device such as an intelligent mobile phone, notebook computer or tablet, and usually the controller is an intelligent mobile terminal.

The wireless router may store identification information of the controller. For example, the wireless router may store Media Access Control (MAC) address of the controller or a mobile phone number or an instant message account. The identification information of the controller can uniquely identify the controller.

The above-mentioned optimum wireless channel selection command could be sent to the wireless router actively by the controller. In a specific example, when the user notices that the network speed is too slow to satisfy with his or her online surfing demand, he or she may click a relevant application (for example, the wireless router management application which may offer a wireless channel redistribution function) in the controller to bring the relevant application into an operating state, and then the user may activate the wireless channel redistribution function in the application to cause the controller to actively send the optimum wireless channel selection command to the wireless router. In another specific example, when the user notices that the network speed is too slow to satisfy with his or her online surfing demand, he or she may click a relevant application (for example, the wireless router management application which may offer a wireless channel redistribution function) in the controller to bring the relevant application into an operating state, and then the user may activate a current working channel test function in the application to cause the controller to send a current working channel test request to the wireless router. Upon the receipt of the current working channel test request from the controller, the wireless router may test the channel quality of its current working channel and transmit obtained channel quality information of the current working channel by testing to the controller. The controller may show the channel quality information of the current working channel transmitted from the wireless router to the user. If the user notices that the channel quality of the current working channel is poor or terrible according to the information shown by the controller, then he or she may activate the wireless channel redistribution function in the application to cause the controller to actively send the optimum wireless channel selection command to the wireless router.

In above description, upon the receipt of the channel quality information of the current working channel from the wireless router, the controller may inform the user of the channel quality information of the current working channel transmitted from the wireless router and received by the controller. For example, an icon of the wireless router management application on the controller may blink or the icon may display an identifier for the receipt of new information. After the user clicks the icon of the application, the wireless router management application may provide the user with display frames which may contain channel quality information of the current working channel latest received by the controller. The display frames may further contain the wireless channel redistribution function for the user to send the optimum wireless channel selection command. For example, the display frames may contain a "reset current working channel" key. In this case, after the user clicks the key, the wireless router management application may generate the optimum wireless channel selection command accordingly, and then the controller may transmit the optimum wireless channel selection command to the wireless router.

The above-mentioned optimum wireless channel selection command could also be sent to the wireless router by the controller in response to a request of the wireless router. In other words, the controller may passively send the optimum wireless channel selection command to the wireless router in response to the request of the wireless router. In a specific example, the wireless router may periodically test the channel quality of its current working channel; when the wireless router determines that the channel quality of its current working channel is lower than a threshold of channel quality, it may actively send an optimum wireless channel selection request to the controller; upon the receipt of the optimum wireless channel selection request transmitted from the wireless router, the controller may prompt the user whether to interrupt the wireless network to redistribute the wireless channels; if the controller receives information input from the user that represents for interrupting the wireless network to redistribute the wireless channels, then the controller may generate an optimum wireless channel selection command and send the optimum wireless channel selection command to the wireless router; and if the controller receives information input from the user that represents for not interrupting the wireless network to redistribute the wireless channels, then the controller may generate an optimum wireless channel selection response carrying information of not redistributing the wireless channels and send the response to the wireless router.

The above-mentioned optimum wireless channel selection command and current working channel test request may both carry the identification information of the controller. The wireless router may first judge whether the identification information carried in its received optimum wireless channel selection command/current working channel test request is identical to the identification information stored in the controller. If it is judged that they are identical, then the wireless router may execute relevant operations according to its received optimum wireless channel selection command/current working channel test request. If it is judged that they are not identical, then the wireless router may not execute relevant operations according to its received optimum wireless channel selection command/current working channel test request and return response information such as "You have no right to operate" to the controller.

No matter whether the wireless router periodically tests the channel quality of its current working channel or the wireless router tests the channel quality of its current working channel in response to the request of the controller, the specific implementation process in which the wireless router tests the channel quality of the current working channel could be as follows: the wireless router, on its current working channel, monitoring beacon broadcast packets sent from other wireless routers, and determining the number of wireless routers which are using its current working channel according to the monitored beacon broadcast packets. In addition, the wireless router may determine a time period allowable to send a WiFi data message, a time period allowable to receive an arrival of WiFi data message and a time period of an arrival a non-WiFi data message (for example, a signal sent by and disturbance generated by an electronic device, such as a microwave oven and a Bluetooth module, including a 2.4G module), for the current working channel. Then the wireless router may determine a proportion of the three time periods. The wireless router may determine a busy level of its current working channel according to the number of other wireless routers which are using its current working channel and the proportion of the time periods.

In addition, it should be explained that each of the above-mentioned optimum wireless channel selection command, optimum wireless channel selection request and current working channel test request can be directly connected and transmitted to the wireless router through the controller or transmitted through a server. In a specific example, when the controller are the wireless router are directly connected, the controller may actively send the optimum wireless channel selection command (for example, HTTP-based information) containing the controller identification information to the wireless router through the direct connection. In another specific example, when the controller are the wireless router are directly connected, the wireless router may send the optimum wireless channel selection request to the controller through the direct connection, and upon the receipt of the request, the controller may send the optimum wireless channel selection command (for example, HTTP-based information) containing the controller identification information to the wireless router through the direct connection. In still another specific example, no matter whether the controller and the wireless router are directly connected, the controller may send the optimum wireless channel selection command (for example, HTTP-based information) containing controller identification information and wireless router identification information to the sever according server address information stored therein, and then the server may transmit the optimum wireless channel selection command containing controller identification information to the wireless router according to the wireless router identification information. In a fourth specific example, no matter whether the controller and the wireless router are directly connected, the wireless router may send the optimum wireless channel selection request (for example, HTTP-based information) containing controller identification information and wireless router identification information to the server according the server address information stored therein, then the server may transmit its received optimum wireless channel selection request to the controller according to the controller identification information, upon the receipt of the optimum wireless channel selection request, the controller may transmit the optimum wireless channel selection command containing controller identification information and wireless router identification information to the server according the server address information stored therein, and then the server may transmit the optimum wireless channel selection command containing controller identification information to the wireless router according to the wireless router identification information.

In a specific example of the optimum wireless channel selection command based on HTTP, information carried in a HTTP-based message and representing for wireless channel redistribution and WiFi module restart may employ a Json format, and the message may contain a "command" field; when the message carries the information representing for wireless channel redistribution and WiFi module restart, contents of the "command" field in the message may be set to "selectChannel" by the controller; in addition, the message may also carry contents for verifying a validity and an integrity of the message.

S110, the wireless router scanning channel quality of each wireless channel.

In particular, when the wireless router is scanning the channel quality of each wireless channel, the connection between the wireless router and the mobile device (which may include the controller) may be interrupted. The specific implementation process in which the wireless router tests the channel quality of each wireless channel could be as follows: the wireless router, on each wireless channel, monitoring beacon broadcast packets sent from other wireless routers, and determining the number of other wireless routers which are using the wireless channel as a current working channel according to the monitored beacon broadcast packets, respectively. In addition, the wireless router may determine a time period allowable to send a WiFi data message, a time period allowable to receive an arrival of WiFi data message and a time period of an arrival a non-WiFi data message (for example, a signal sent by and disturbance generated by an electronic device, such as a microwave oven and a Bluetooth module, including a 2.4G module), for each wireless channel, respectively. Then the wireless router may determine a proportion of the three time periods for each wireless channel, respectively. The wireless router may determine a busy level of each wireless channel according to the number of other wireless routers which are using the wireless channel as its current working channel and the proportion of the time periods, respectively.

S120, the wireless router, according to the channel quality of each wireless channel obtained by scanning, selecting a current working channel of the wireless router.

In particular, the wireless router may select a wireless channel having optimum channel quality from all the wireless channels and use this wireless channel as the current working channel. The wireless router may store the identification information of the selected current working channel in the WiFi module, or the wireless router may store the identification information of the selected current working channel independently of the WiFi module.

S130, the wireless router restarting a wireless connection module thereof and implementing information exchange with a mobile device according to the current working channel.

In particular, the wireless connection module could be a module capable of connecting the mobile device to the network, such as WiFi module. The wireless router may only restart the WiFi module therein instead of restarting the wireless router itself. For example, a control module in the wireless router may first power off the WiFi module, and then the control module may re-energize the WiFi module with a predefined time interval to restart the WiFi module and set its current working channel according to the stored identification information of the current working channel. The wireless router may rebuild a connection with mobile devices and implement information exchange with the mobile devices according to the current working channel.

The second embodiment is directed to a wireless channel redistribution apparatus. Hereinafter the apparatus according to this embodiment will be described in detail with reference to FIG. 2.

The wireless channel redistribution apparatus in this embodiment is provided in a wireless router, and the wireless router in this embodiment corresponds to a controller which could be a terminal device capable of triggering the wireless router to redistribute wireless channels thereof, such as a terminal device installed with a wireless router management application. The controller could specifically be an intelligent terminal device such as an intelligent mobile phone, notebook computer or tablet, and usually the controller is an intelligent mobile terminal. In addition, the wireless channel redistribution apparatus may store identification information of the controller. For example, the wireless channel redistribution apparatus may store Media Access Control (MAC) address of the controller or a mobile phone number or an instant message account. The identification information of the controller can uniquely identify the controller.

Figure 2:
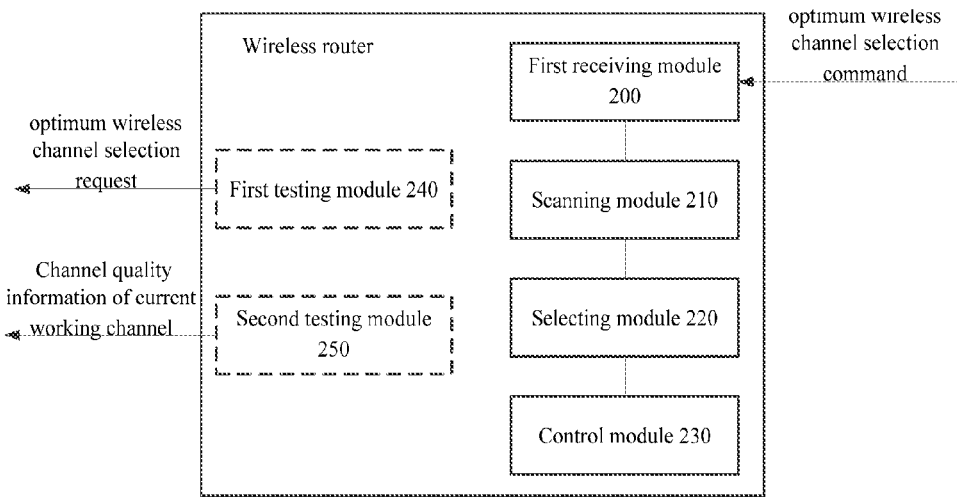
FIG. 2 illustrates a block diagram of a wireless channel redistribution apparatus according to an embodiment of the disclosure.

The apparatus as shown in FIG. 2 may substantially include: a first receiving module 200, a scanning module 210, a selecting module 220 and a control module 230, wherein the scanning module 210 is connected to the first receiving module 200 and the selecting module 220, respectively, and the selecting module 220 is connected to the control module 230. Also, the apparatus may optionally include: either one or both of a first testing module 240 and a second testing module 250.

The first receiving module 200 is substantially configured for the wireless router to receive an optimum wireless channel selection command transmitted from a controller.

In particular, the above-mentioned optimum wireless channel selection command could be actively sent to the wireless router by the controller. Or the above-mentioned optimum wireless channel selection command could also be sent to the wireless router by the controller in response to a request of the wireless router. In other words, the controller may passively send the optimum wireless channel selection command to the wireless router in response to the request of the wireless router.

In a specific example, when the user notices that the network speed is too slow to satisfy with his or her online surfing demand, he or she may click a relevant application (for example, the wireless router management application which may offer a wireless channel redistribution function) in the controller to bring the relevant application into an operating state, and then the user may activate a current working channel test function in the application to cause the controller to send a current working channel test request to the wireless router. When the wireless router receives the current working channel test request transmitted from the controller, the second testing module 250 may test the channel quality of its current working channel and transmit the obtained channel quality information of the current working channel by testing to the controller. The controller may show the channel quality information of the current working channel transmitted from the wireless router to the user. If the user notices that the channel quality of the current working channel is poor or terrible according to the information shown by the controller, then he or she may activate the wireless channel redistribution function in the application to cause the controller to actively send the optimum wireless channel selection command to the wireless router.

In another specific example, the first testing module 240 may periodically test the channel quality of the current working channel for the wireless router. When the first testing module 240 determines that the channel quality of the current working channel for the wireless router is lower than a threshold of channel quality, it may actively send an optimum wireless channel selection request to the controller, upon the receipt of the optimum wireless channel selection request transmitted from the wireless router, the controller may prompt the user whether to interrupt the wireless network to redistribute the wireless channels; if the controller receives information input from the user that represents for interrupting the wireless network to redistribute the wireless channels, then the controller may generate an optimum wireless channel selection command and send the optimum wireless channel selection command to the wireless router; and if the controller receives information input from the user that represents for not interrupting the wireless network to redistribute the wireless channels, then the controller may generate an optimum wireless channel selection response carrying information of not redistributing the wireless channels and send the response to the wireless router.

The above-mentioned optimum wireless channel selection command and current working channel test request may both carry the identification information of the controller. The first receiving module 200 and the second testing module 250 may first judge whether the identification information carried in its received optimum wireless channel selection command/current working channel test request is identical to the identification information stored in the controller. If it is judged that the two pieces of identification information are identical, then the first receiving module 200 and the second testing module 250 may execute relevant operations (for example, the first receiving module 200 triggers the scanning module 210 to scan the channel quality of each wireless channel) according to its received optimum wireless channel selection command/current working channel test request. If it is judged that the two pieces of identification information are not identical, the first receiving module 200 and the second testing module 250 may not execute relevant operations according to its received optimum wireless channel selection command/current working channel test request and return response information such as "You have no right to operate" to the controller.

No matter whether the first testing module 240 periodically tests the channel quality of its current working channel or the second testing module 250 tests the channel quality of its current working channel in response to the request of the controller, the specific implementation process in which the first testing module 240 and the second testing module 250 test the channel quality of the wireless router current working channel could be as follows: on the current working channel of the wireless router, monitoring beacon broadcast packets sent from other wireless routers, and determining the number of wireless routers which are using its current working channel according to the monitored beacon broadcast packets. In addition, it also should determine a time period allowable to send a WiFi data message, a time period allowable to receive an arrival of WiFi data message and a time period of an arrival a non-WiFi data message (for example, a signal sent by and disturbance generated by an electronic device, such as a microwave oven and a Bluetooth module, including a 2.4G module), for the current working channel. Then the first testing module 240 and the second testing module 250 may determine a proportion of the three time periods. The first testing module 240 and the second testing module 250 may determine a busy level of the current working channel of the wireless router according to the number of other wireless routers which are using the current working channel thereof and the proportion of the time periods.

In addition, it should be explained that each of the above-mentioned optimum wireless channel selection command, optimum wireless channel selection request and current working channel test request can be directly connected and transmitted to the wireless router through the controller or transmitted through a server. The specific example thereof is the same as the method embodiment as described above, the explanation of which will be omitted herein.

The optimum wireless channel selection command in this embodiment could be an optimum wireless channel selection command based on HTTP. For example, information carried in a HTTP-based message received by the first receiving module 200 and representing for wireless channel redistribution and WiFi module restart may employ a Json format, and the message may contain a "command" field; when the message carries the information representing for wireless channel redistribution and WiFi module restart, contents of the "command" field in the message may be set to "selectChannel" by the controller; in addition, the message may also carry contents for verifying a validity and an integrity of the message.

The scanning module 210 is substantially configured for the wireless router to scan channel quality of each wireless channel.

In particular, when the scanning module 210 is scanning the channel quality of each wireless channel in the wireless router, the connection between the wireless router and the mobile device (which may include the controller) may be interrupted. The specific implementation process in which the scanning module 210 tests the channel quality of each wireless channel could be as follows: the scanning module 210, on each wireless channel of the wireless router, monitoring beacon broadcast packets sent from other wireless routers, and determining the number of other wireless routers which are using the wireless channel as a current working channel according to the monitored beacon broadcast packets, respectively. In addition, the scanning module 210 may determine a time period allowable to send a WiFi data message, a time period allowable to receive an arrival of WiFi data message and a time period of an arrival a non-WiFi data message (for example, a signal sent by and disturbance generated by an electronic device, such as a microwave oven and a Bluetooth module, including a 2.4G module), for each wireless channel, respectively. Then the scanning module 210 may determine a proportion of the three time periods for each wireless channel, respectively. The scanning module 210 may determine a busy level of each wireless channel according to the number of other wireless routers which are using the wireless channel as its current working channel and the proportion of the time periods, respectively.

The selecting module 220 is substantially configured for the wireless router to select a current working channel thereof according to the channel quality of each wireless channel obtained by scanning.

In particular, the selecting module 220 may select a wireless channel having optimum channel quality from all the wireless channels and use this wireless channel as the current working channel. The selecting module 220 may store the identification information of the selected current working channel in the WiFi module, or the selecting module 220 may store the identification information of the selected current working channel independently of the WiFi module.

The control module 230 is substantially configured for the wireless router to restart a wireless connection module thereof, such that the wireless router implements information exchange with a mobile device according to the current working channel selected by the selecting module 220 after the wireless connection module is restarted.

In particular, the wireless connection module a module capable of connecting the mobile device to the network, such as WiFi module. The control module 230 may only restart the WiFi module inside the wireless router instead of restarting the wireless router itself. For example, the control module 230 may first power off the WiFi module, and then the control module 230 may re-energize the WiFi module with a predefined time interval to restart the WiFi module. The WiFi module may set the current working channel of the wireless router according to the identification information of the current working channel stored in the wireless router after it is restarted. In such a manner, the wireless router may rebuild a connection with mobile devices and implement information exchange with the mobile devices according to the current working channel.

The third embodiment is directed to a transmit power regulation method of a wireless router. Hereinafter the method according to this embodiment will be described in detail with reference to FIG. 3. The mentioned wireless router could be the wireless router according to the first or second embodiment, or an individual wireless router.

Figure 3:
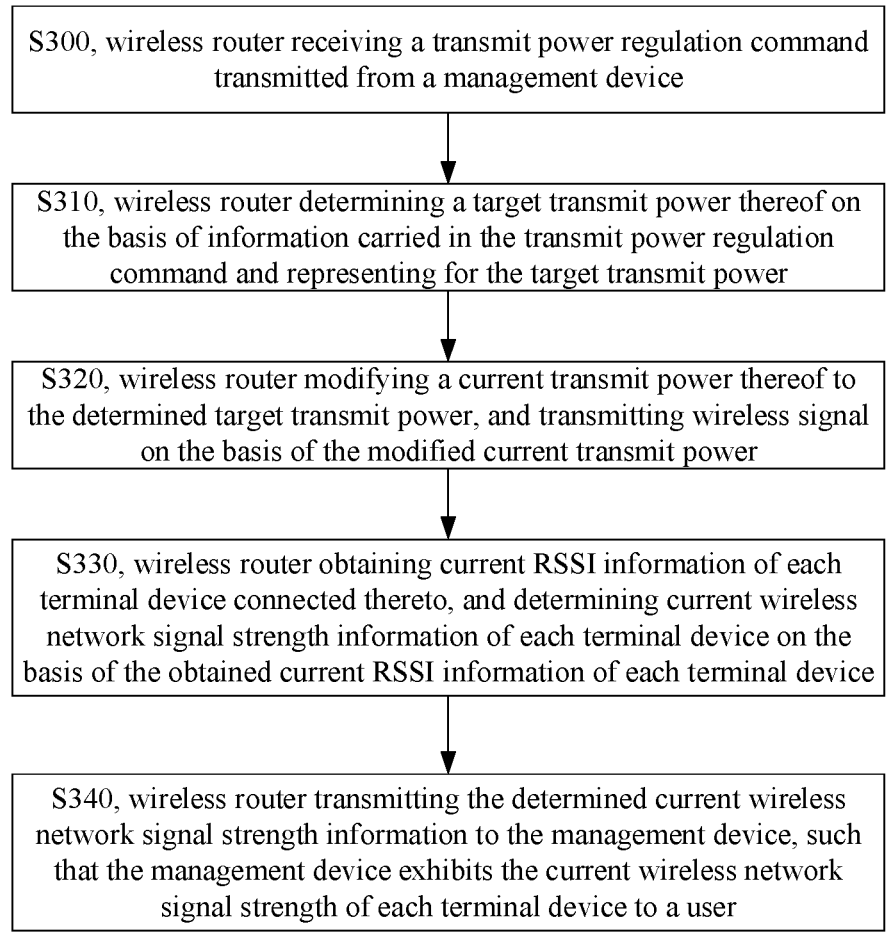
FIG. 3 illustrates a flow chart of a transmit power regulation method of a wireless router according to an embodiment of the disclosure.

In FIG. 3, S300, the wireless router receiving a transmit power regulation command transmitted from a management device.

In particular, the management device in this embodiment could be a terminal device (especially a mobile terminal device) which can login on a backstage management page of the wireless router in the name of an administrator. In a specific example, a user may input access address (for example, 192.168.1.1) of the wireless router in an address bar of a browser of the mobile terminal device. After the user click advanced settings in the page corresponding to the access address, the user may input a username (for example, admin) and a password (for example, admin) in a relevant window popped up on the mobile terminal device, such that the user's mobile terminal device may login on the backstage management page of the wireless router. The mobile terminal device becomes the management device in this embodiment.

Of course, the management device in this embodiment could also be a preset terminal device. For example, the wireless router may store in advance identification information of the management device, which could be Media Access Control (MAC) address of the terminal device or a mobile phone number of the terminal device or an instant message account of the terminal device. The identification information of the management device can uniquely identify the terminal device.

In order for the user to definitely and purposefully send a transmit power regulation command to the wireless router via the terminal device thereof, in this embodiment, the user's terminal device may exhibit a wireless network signal receiving status of all terminal devices which are in connection with the wireless router to the user. Preferably, the user's terminal device may exhibit the wireless network signal receiving status of all the terminal devices which are in connection with the wireless router to the user in the form of icons, to provide an improved intuition of the wireless network signal receiving status. In addition, the wireless network signal receiving status of all the terminal devices which are in connection with the wireless router is obtained by converting current RSSI (Received Signal Strength Indication) information of all the terminal devices which are in connection with the wireless router.

In a specific example in which the management device sends the transmit power regulation command to the wireless router, after the user clicks an icon of the wireless router management application in the mobile terminal device thereof, the application may be triggered to send a signal strength request message (for example, a HTTP-based request message) to the wireless router through the mobile terminal device. Upon the receipt of the signal strength request message, the wireless router may obtain a mobile terminal device identifier from the signal strength request message. When the mobile terminal device identifier is judged to be identical to a management device identifier stored in the wireless router, the wireless router may obtain the current RSSI information of all the terminal devices connected thereto, and determine current wireless network signal strength information of each terminal device according to the current RSSI information of each terminal device. The wireless router may return a corresponding response message (for example, a HTTP-based response message) to the mobile terminal device which sends the request message. The response message may contain the current wireless network signal strength information of each terminal device. Preferably, the current wireless network signal strength information of each terminal device in the response message is represented in a graphic form (i.e., icon). Up the receipt of the response message, the mobile terminal device may sequentially exhibit to the user the current wireless network signal strength information of each terminal device in the graphic form carried in the response message. The user may clearly obtain the wireless network signal receiving status of each terminal device according to the sequentially arranged icons, so that the user can determine whether to regulate the transmit power of the wireless router. For example, when the wireless network signal of user's terminal device or terminal devices within a wireless coverage provided by the wireless router is weak, the user may send a transmit power regulation command for increasing the transmit power to the wireless router. As another example, when the wireless network signals of all the user's terminal devices within the wireless coverage provided by the wireless router are strong, the user may send a transmit power regulation command for reducing the transmit power to the wireless router.

In another specific example in which the management device sends the transmit power regulation command to the wireless router, the user may input access address (for example, 192.168.1.1) of the wireless router in the address bar of the browser of the mobile terminal device. After the user click advanced settings in the page corresponding to the access address, the user may input the username (for example, admin) and the password (for example, admin) in the window popped up on the mobile terminal device, such that the user's mobile terminal device may login on the backstage management page of the wireless router. The user may click a transmit power option in the backstage management page, to trigger the mobile terminal device to send a page request message (for example, a HTTP-based request message) to the wireless router. When the wireless router receives the page request message and judges that a page corresponding to the page request message contains the transmit power, the wireless router may obtain the current RSSI information of each terminal device connected thereto, and determine current wireless network signal strength information of each terminal device according to the current RSSI information of each terminal device. The wireless router may return a corresponding response message (for example, a HTTP-based response message) to the mobile terminal device which sends the page request message. The response message may contain the current wireless network signal strength information of each terminal device. Preferably, the current wireless network signal strength information of each terminal device in the response message is represented in a graphic form (i.e., icon). Up the receipt of the response message, the mobile terminal device may sequentially exhibit to the user the current wireless network signal strength information of each terminal device in the graphic form carried in the response message. The user may clearly obtain the wireless network signal receiving status of each terminal device according to the sequentially arranged icons, so that the user can determine whether to regulate the transmit power of the wireless router. For example, when the wireless network signal of user's terminal device or terminal devices within a wireless coverage provided by the wireless router is weak, the user may send a transmit power regulation command for increasing the transmit power to the wireless router. As another example, when the wireless network signals of all the user's terminal devices within the wireless coverage provided by the wireless router are strong, the user may send a transmit power regulation command for reducing the transmit power to the wireless router.

In this embodiment, the information exchange between the management device and the wireless router may be achieved by the direct connection between the management device and the wireless router or may be achieved by a transfer of the server.

In a specific example of the information exchange between the management device and the wireless router, when there is a direct connection between the management device and the wireless router, the management device may send the page request message to the wireless router through the direct connection. After the wireless router receives the page request message and determines that the page corresponding to the page request message contains the transmit power, the wireless router may transmit the response message containing the identification information of the management device and the current wireless network signal strength information of each terminal device in the graphic form to the server according to the server address information stored therein. Then the server may transmit the response message containing the current wireless network signal strength information of each terminal device in the graphic form to the management device according to the identification information of the management device.

In another specific example of the information exchange between the management device and the wireless router, when there is a direct connection between the management device and the wireless router, the management device may send the page request message to the wireless router through the direct connection. After the wireless router receives the page request message and determines that the page corresponding to the page request message contains the transmit power, the wireless router may transmit the response message containing the current wireless network signal strength information of each terminal device in the graphic form to the management device through the direct connection.

In a third specific example of the information exchange between the management device and the wireless router, no matter whether there is a direct connection between the management device and the wireless router, the management device may send the page request message containing the wireless router identification information to the server according to the server address information stored therein. Then the server may transmit the page request message to the wireless router according to the wireless router identification information. After the wireless router receives the page request message from the management device and determines that the page corresponding to the page request message contains the transmit power, the wireless router may transmit the response message containing the identification information of the management device and the current wireless network signal strength information of each terminal device in the graphic form to the server according to the server address information stored therein. Then the server may transmit the response message containing the current wireless network signal strength information of each terminal device in the graphic form to the management device according to the identification information of the management device.

In the above-mentioned first and third specific examples, the server may complete a format conversion of message as necessary.

In this embodiment, the transmit power regulation command dent from the management device may contain information representing for target transmit power. The information representing for the target transmit power may be provided in a percentage value form or in a fractional value form, for example. In addition, a display page capable of regulating the transmit power that is provided for the user by the management device may contain a transmit power regulation bar. The transmit power regulation bar definitely marks a number of percentages of the transmit power, for example, 25%, 50%, 75% and 100%. In such a manner, the user may set the target transmit power of the wireless router by dragging a regulation cursor on the transmit power regulation bar. Of course, the user may set the target transmit power of the wireless router otherwise. For example, the user may set the target transmit power of the wireless router by inputting a relevant fractional or percentage value.

It should be explained specially that the transmit power regulation command in this embodiment may be directed to all the terminal devices connected to the wireless router, or to one or more terminal device connected to the wireless router. In other words, the current transmit powers provided for the terminal devices by the wireless router could be varied. It could be seen that this embodiment may not only regulate the current transmit powers for one or more terminal device but also regulate the current transmit powers for all the terminal devices.

S310, the wireless router determining a target transmit power thereof according to information carried in the transmit power regulation command and representing for the target transmit power.

In particular, when the information carried in the transmit power regulation command and representing for the target transmit power is provided in the form of percentage value (or a fractional value), the wireless router may perform a multiplication operation of a maximum transmit power thereof by the percentage value (or the fractional value) and use the result of the multiplication operation as the target transmit power of the wireless router.

In this embodiment, the wireless router may further process the target transmit power obtained by the multiplication operation (revision process), to obtain a final target transmit power. For example, when a value obtained by the multiplication operation has decimal, the wireless router may round up, round off or take approximation of the result obtained by the multiplication operation and determine the revised result as the final target transmit power of the wireless router.

In a specific example of taking approximation, the wireless router may store a plurality of transmit powers having different values. The wireless router may compare the value obtained by the multiplication operation with values of respective transmit powers stored therein to select a transmit power closest approximate to the multiplication operation result from the transmit powers stored therein, and use the closest approximate transmit power as the final target transmit power of the wireless router.

The target transmit power of the wireless router could be a target transmit power of the wireless router for one or more terminal device, or a target transmit power of the wireless router for all the terminal devices connected to the wireless router. In other words, the information carried in the transmit power regulation command may contain information of respective target transmit powers for different terminal devices.

S320, the wireless router modifying a current transmit power thereof to the determined target transmit power, and transmitting wireless signal based on the modified current transmit power.

In particular, the wireless router in the prior art usually may operate according to the modified current transmit power without restarting; if the wireless router is required to operate according to the modified current transmit power after restarting, then the wireless router may necessarily warmly restart first and operate according to the modified current transmit power after warmly restarting.

When the target transmit power in this embodiment refers to a target transmit power for one terminal device or a plurality of terminal devices, the step of transmitting wireless signal based on the modified current transmit power means that the wireless router transmits the wireless signal based on the modified current transmit power only for one terminal device or a plurality of terminal devices. When the target transmit power in this embodiment is a target transmit power for all the terminal devices connected to the wireless router, the step of transmitting wireless signal based on the modified current transmit power means that the wireless router transmits the wireless signal based on the modified current transmit power for all the terminal devices.

In addition, the wireless router may record current transmit power information corresponding to different terminal devices connected thereto (for example, information about a correspondence relation between IP address or MAC address of the terminal device and the current transmit power). When a current transmit power of a terminal device is modified, the wireless router may modify the current transmit power in above correspondence relation to a corresponding target transmit power.

Furthermore, when transmitting signal, the wireless router may determine the terminal device receiving data packet according to IP address or MAC address corresponding to the data packet needed to transmit, then determine a current transmit power corresponding to the terminal device according to its recorded information, and subsequently send the data packet according to the terminal device corresponding to the current transmit power.

S330, the wireless router obtaining current RSSI information of all the terminal devices connected thereto, and determining current wireless network signal strength information of each terminal device according to the obtained current RSSI information of each terminal device.

In particular, after the wireless router modifies the current transmit power thereof, a wireless network signal receiving status of each terminal device usually may vary therewith. The wireless router in this embodiment may obtain the current wireless network signal strength information of each terminal device at the first time after its current transmit power is regulated, such that the current wireless network signal strength information of each terminal device could be given to the management device as early as possible. Further, the management device could timely exhibit the wireless network signal receiving status of each terminal device to the user as early as possible, such that the user may definitely learn whether the transmit power regulation at this time satisfies with his or her requirements. For example, after the wireless router restarts and operates according to the modified current transmit power, the wireless router may immediately obtain the current wireless network signal strength information of each terminal device.

Preferably, the current wireless network signal strength information of each terminal device is represented in the graphic form. In other words, the wireless router may convert the current RSSI information of each terminal device to the graphic form (for example, a bar graph or a pie graph).

S340, the wireless router transmitting the determined current wireless network signal strength information to the management device, such that the management device exhibits the current wireless network signal strength of each terminal device to a user.

In particular, the wireless router may transmit its obtained current wireless network signal strength information to the management device through the HTTP-based message. The management device may exhibit the current wireless network signal strength of each terminal device to the user such that the user may definitely learn the result of the transmit power regulation this time. In such a manner, if the user does not satisfy the result of the transmit power regulation this time, then he or she may continuously regulate the transmit power of the wireless router for example by dragging the regulation cursor again or inputting numerical value again.

It should be explained that the information exchange between the wireless router and the management device in this step may be achieved by the direct connection between the wireless router and the management device or may be achieved by a transfer of the server. Reference could be made to the specific description as illustrated at S300, and thus the detailed explanation of thereof will be omitted herein.

The fourth embodiment is directed to a transmit power regulation device of a wireless router. Hereinafter the device t will be described in detail with reference to FIG. 4. The mentioned wireless router could be the wireless router according to the first or second embodiment, or an individual wireless router.

Figure 4:
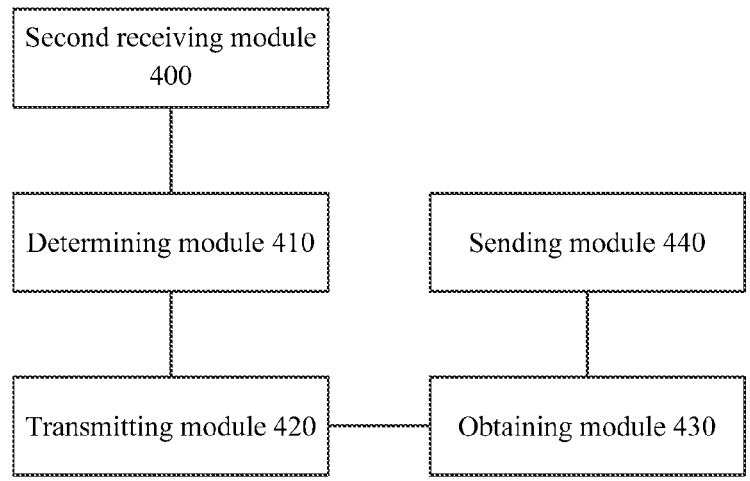
FIG. 4 illustrates a block diagram of a transmit power regulation device of a wireless router according to an embodiment of the disclosure.

The device as shown in FIG. 4 is provided in a wireless router and may substantially include: a second receiving module 400, a determining module 410, a transmitting module 420, an obtaining module 430 and a sending module 440, wherein the determining module 410 is connected to the second receiving module 400 and the transmitting module 420, respectively, and the obtaining module 430 is connected to the transmitting module 420 and sending module 440, respectively.

The second receiving module 400 is substantially configured to receive a transmit power regulation command transmitted from a management device.

In particular, the above management device could be a terminal device (especially a mobile terminal device) which can login on a backstage management page of the wireless router in the name of an administrator. In a specific example, a user may input access address (for example, 192.168.1.1) of the wireless router in an address bar of a browser of the mobile terminal device. After the user click advanced settings in the page corresponding to the access address, the user may input a username (for example, admin) and a password (for example, admin) in a relevant window popped up on the mobile terminal device, such that the user's terminal device may login on the backstage management page of the wireless router. The mobile terminal device becomes the management device in this embodiment.

Of course, the management device in this embodiment could also be a preset terminal device. For example, the wireless router may store in advance identification information of the management device, which could be Media Access Control (MAC) address of the terminal device or a mobile phone number of the terminal device or an instant message account of the terminal device. The identification information of the management device can uniquely identify the terminal device.

The transmit power regulation command received by the second receiving module 400 could be a transmit power regulation command sent by the management device through the direct connection with the wireless router, or could be a transmit power regulation command sent by the management device through the server. In other words, the information exchange between the management device and the device in this embodiment may be achieved by the direct connection between the management device and the wireless router or may be achieved by a transfer of the server.

The transmit power regulation command received by the second receiving module 400 may contain information representing for target transmit power. The information representing for the target transmit power may be provided in a percentage value form or in a fractional value form, for example.

It should be explained specially that the transmit power regulation command received by the second receiving module 400 may be directed to all the terminal devices connected to the wireless router, or to one or more terminal device connected to the wireless router. In other words, the current transmit powers provided for the terminal devices by the transmitting module 420 could be varied. It could be seen that this embodiment may not only regulate the current transmit powers for one or more terminal device but also regulate the current transmit powers for all the terminal devices.

The determining module 410 is substantially configured to determine a target transmit power according to information carried in the transmit power regulation command received by the second receiving module 400 and representing for the target transmit power.

In particular, when the information carried in the transmit power regulation command and representing for the target transmit power is provided in the form of percentage value (or a fractional value), the determining module 410 may perform a multiplication operation of a maximum transmit power of the wireless router by the percentage value (or the fractional value) and use the result of the multiplication operation as the target transmit power of the wireless router.

The determining module 410 may further process the target transmit power obtained by the multiplication operation (revision process), to obtain a final target transmit power. For example, when a value obtained by the multiplication operation has decimal, the determining module 410 may round up, round off or take approximation of the result obtained by the multiplication operation and determine the revised result as the final target transmit power of the wireless router.

In a specific example of taking approximation, the determining module 410 may store a plurality of transmit powers having different values. The determining module 410 may compare the value obtained by the multiplication operation with values of respective transmit powers stored therein to select a transmit power closest approximate to the multiplication operation result from the transmit powers stored therein, and use the closest approximate transmit power as the final target transmit power of the wireless router.

The target transmit power determined by the determining module 410 could be a target transmit power of the determining module 410 for one or more terminal device, or a target transmit power of the determining module 410 for all the terminal devices connected to the wireless router.

The transmitting module 420 is substantially configured to modify the current transmit power of the wireless router to the target transmit power determined by the determining module 410 and transmit wireless signal according to the modified current transmit power.

The transmitting module 420 may operate according to the modified current transmit power without restarting the wireless router. If the wireless router is required to restart such that the transmitting module 420 operates according to the modified current transmit power, then the transmitting module 420 may warmly start the wireless router, and after warmly starting, the transmitting module 420 may operate according to the modified current transmit power.

When the target transmit power in this embodiment refers to a target transmit power for one terminal device or a plurality of terminal devices, the wireless signal transmission of the transmitting module 420 based on the modified current transmit power means that the transmitting module 420 transmits the wireless signal based on the modified current transmit power only for one terminal device or a plurality of terminal devices. When the target transmit power in this embodiment is a target transmit power for all the terminal devices connected to the wireless router, the wireless signal transmission of the transmitting module 420 based on the modified current transmit power means that the transmitting module 420 transmits the wireless signal based on the modified current transmit power for all the terminal devices.

In addition, the transmitting module 420 may record current transmit power information corresponding to different terminal devices connected to the wireless router (for example, information about a correspondence relation between IP address or MAC address of the terminal device and the current transmit power). When a current transmit power of a terminal device is modified, the transmitting module 420 may modify the current transmit power in above correspondence relation to a corresponding target transmit power.

Furthermore, when transmitting signal, the transmitting module 420 may determine the terminal device receiving data packet according to IP address or MAC address corresponding to the data packet needed to transmit, then determine a current transmit power corresponding to the terminal device according to its recorded information, and subsequently the transmitting module 420 may send the data packet according to the terminal device corresponding to the current transmit power.

The obtaining module 430 is substantially configured to obtain current RSSI (Received Signal Strength Indication) information of each terminal device connected to the wireless router, and determine current wireless network signal strength information of each terminal device according to the current RSSI information of each terminal device.

In particular, after the transmitting module 420 modifies the current transmit power of the wireless router, a wireless network signal receiving status of each terminal device usually may vary therewith. The wireless router in this embodiment may provide the current wireless network signal strength information of each terminal device for the management device at the first time after its current transmit power is regulated, such that the management device may exhibit the wireless network signal receiving status of each terminal device to the user in time, and thus the user may definitely learn whether the transmit power regulation at this time satisfies with his or her requirements. For example, after the wireless router restarts and the transmitting module 420 operates according to the modified current transmit power, the obtaining module 430 may immediately obtain the current RSSI information of each terminal device and determine the current wireless network signal strength information of each terminal device.

Preferably, the current wireless network signal strength information of each terminal device is represented in the graphic form. In other words, the obtaining module 430 may convert the current RSSI information of each terminal device to the graphic form (for example, a bar graph or a pie graph).

The sending module 440 is substantially configured to transmit the current wireless network signal strength information of each terminal device determined by the obtaining module 430 to the management device, such that the management device exhibits the current wireless network signal strength of each terminal device to the user.

In particular, the sending module 440 may transmit the current wireless network signal strength information of each terminal device determined by the obtaining module 430 to the management device through the HTTP-based message. The management device then may exhibit the current wireless network signal strength of each terminal device to the user such that the user may definitely learn the result of the transmit power regulation this time. In such a manner, if the user does not satisfy the result of the transmit power regulation this time, then he or she may continuously regulate the transmit power of the wireless router for example by dragging the regulation cursor again or inputting numerical value again. Algorithm and display provided herein are not inherently related to a particular computer, virtual system or other equipment. Various general systems may also be used with the teaching based on the disclosure. According to the above description, the required structure for constructing such a system is obvious. In addition, the disclosure is not directed to any specific programming language. It should be understood that a variety of programming languages can be used to implement the disclosed contents as described herein and above description to the specific programming language is used to disclose the best inventive implementation mode.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

Similarly, it should be understood that, in order to simplify the disclosure and to facilitate the understanding of one or more of various aspects thereof, in the above description of the exemplary embodiments of the disclosure, various features of the disclosure may sometimes be grouped together into a single embodiment, accompanying figure or description thereof. However, the method of this disclosure should not be constructed as follows: the disclosure for which the protection is sought claims more features than those explicitly disclosed in each of claims. More specifically, as reflected in the following claims, the inventive aspect is in that the features therein are less than all features of a single embodiment as disclosed above. Therefore, claims following specific embodiments are definitely incorporated into the specific embodiments, wherein each of claims can be considered as a separate embodiment of the disclosure.

It should be understood by those skilled in the art that modules of the apparatus in the embodiments can be adaptively modified and arranged in one or more apparatuses different from the embodiment. Modules in the embodiment can be combined into one module, unit or component, and also can be divided into more sub-modules, sub-units or sub-components. Except that at least some of features and/or processes or modules are mutually exclusive, various combinations can be used to combine all the features disclosed in specification (including appended claims, abstract and accompanying figures) and all the processes or units of any methods or devices as disclosed herein. Unless otherwise definitely stated, each of features disclosed in specification (including appended claims, abstract and accompanying figures) may be taken place with an alternative feature having same, equivalent or similar purpose.

In addition, it should be understood by those skilled in the art, although some embodiments as discussed herein comprise some features included in other embodiment rather than other feature, combination of features in different embodiment means that the combination is within a scope of the disclosure and forms the different embodiment. For example, in the claims, any one of the embodiments for which the protection is sought can be used in any combined manners.

Each of components according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the components in the wireless channel redistribution apparatus according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the Internet websites, or be provided in carrier, or be provided in other manners.

Figure 5:
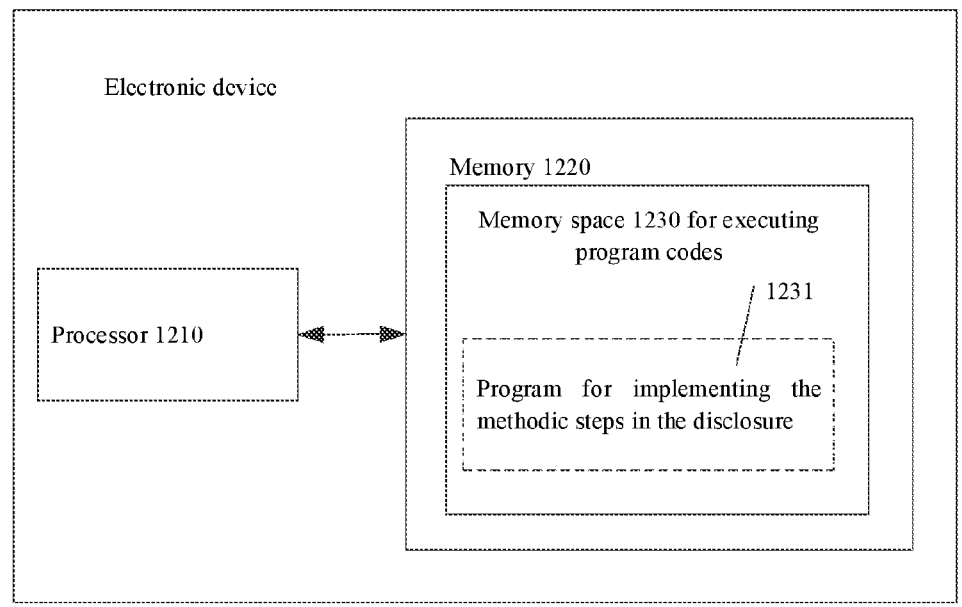
FIG. 5 illustrates a block diagram of an electronic device for executing the methods according the disclosure.
Figure 6:
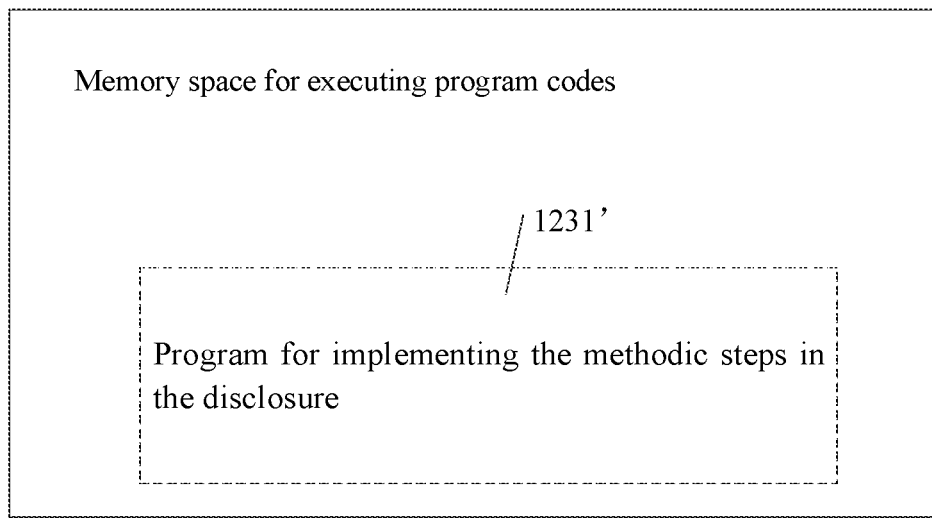
FIG. 6 illustrates a schematic diagram of a memory cell which is used to store and carry program codes for realizing the methods according to the disclosure.

For example, FIG. 5 illustrates an electronic device which may implement the wireless channel redistribution method or the transmit power regulation method of the wireless router according to this disclosure. Traditionally, the electronic device includes a processor 1210 and a computer program product or a computer readable medium in the form of a memory 1220. The memory 1220 could be electronic memories such as flash memory, EEPROM (Electrically Erasable Programmable Read-Only Memory), EPROM, hard disk or ROM. The memory 1220 has a memory space 1230 for executing program codes 1231 of any steps in the above methods. For example, the memory space 1230 for program codes may include respective program codes 1231 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 6. The memory cells may be provided with memory sections, memory spaces, etc., similar to the memory 1220 of the electronic device as shown in FIG. 5. The program codes may be compressed for example in an appropriate form. Usually, the memory cell includes a program 1231' for executing the methodic steps according to the disclosure, which could be codes readable for example by a processor 1210. When these codes are operated on the electronic device, the electronic device may execute respective steps in the method as described above.

The "an embodiment", "embodiments" or "one or more embodiments" mentioned in the disclosure means that the specific features, structures or performances described in combination with the embodiment(s) would be included in at least one embodiment of the disclosure. Moreover, it should be noted that, the wording "in an embodiment" herein may not necessarily refer to the same embodiment.

Many details are discussed in the specification provided herein. However, it should be understood that the embodiments of the disclosure can be implemented without these specific details. In some examples, the well-known methods, structures and technologies are not shown in detail so as to avoid an unclear understanding of the description.

It should be noted that the above-described embodiments are intended to illustrate but not to limit the disclosure, and alternative embodiments can be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

Also, it should be noticed that the language used in the present specification is chosen for the purpose of readability and teaching, rather than explaining or defining the subject matter of the disclosure. Therefore, it is obvious for an ordinary skilled person in the art that modifications and variations could be made without departing from the scope and spirit of the claims as appended. For the scope of the disclosure, the publication of the inventive disclosure is illustrative rather than restrictive, and the scope of the disclosure is defined by the appended claims.

What is claimed is:

1. A method of redistributing wireless channel by a wireless router, comprising:
   receiving, by the wireless router, a request for selecting an optimum wireless channel transmitted from a controller;
   scanning, by the wireless router, channel quality of each wireless channel;
   selecting, by the wireless router, a first channel of the wireless router according to the channel quality of each wireless channel obtained by the scanning;
   storing, by the wireless router, identification information of the first channel;
   restarting, by the wireless router, a wireless connection module; wherein the restarting, by the wireless router, the wireless connection module further comprises:
      powering off the wireless connection module for a predetermined time interval,
      re-energize the wireless connection module after the predetermined time interval, and
      setting a working channel based on the stored identification information of the first channel; and
   implementing, by the wireless router, information exchange with a mobile device according to the working channel, wherein the working channel is the first channel.

2. The method according to claim 1, wherein the method further comprises:
   the wireless router periodically testing a channel quality of the working channel, and when the channel quality of the working channel is lower than a predetermined threshold of channel quality, sending an optimum wireless channel selection request to the controller.

3. The method according to claim 2, wherein the testing the channel quality of the current working channel comprises:
   the wireless router monitoring whether the working channel thereof is used as a working channel by another wireless router at the same time, and monitoring a busy level of the working channel thereof; and
   the wireless router determining the channel quality of the working channel according to a monitored result.

4. The method according to claim 3, wherein when the wireless connection module comprises the WiFi module, the monitoring a busy level of the current working channel thereof comprises:
   the wireless router monitoring a time period allowable to send a WiFi message, a time period allowable to receive the WiFi message and a time period of an arrival of a non-WiFi message for the current working channel, and determining the busy level of the working channel according to a proportion of the three time periods.

5. The method according to claim 1, wherein the method further comprises:
   when the wireless router receives a working channel test request transmitted from the controller, testing the channel quality of the working channel and transmitting obtained channel quality information of the working channel by testing to the controller.

6. The method according to claim 1, wherein the wireless router scanning the channel quality of each wireless channel comprises:
   the wireless router monitoring whether each wireless channel is used as a working channel by another wireless router, and monitoring a busy level of each wireless channel; and
   the wireless router determining the channel quality of each wireless channel according to the monitored result.

7. The method according to claim 1, wherein the method further comprises:
   the wireless router receiving a transmit power regulation command transmitted from a management device;
   the wireless router determining a target transmit power according to information carried in the transmit power regulation command and representing for the target transmit power;
   the wireless router modifying a current transmit power thereof to the target transmit power, and transmitting wireless signal based on the modified current transmit power;
   the wireless router obtaining current RSSI information of each terminal device connected thereto, and determining current wireless network signal strength information of each terminal device according to the current RSSI information of each terminal device; and
   the wireless router transmitting the current wireless network signal strength information to the management device, such that the management device exhibits the current wireless network signal strength of each terminal device to a user.

8. An electronic device for wireless channel redistribution, comprising:
   a memory having instructions stored thereon;
   a processor configured to execute the instructions to perform operations for wireless channel redistribution, comprising:
   receiving, by a wireless router, a request for selecting an optimum wireless channel from a controller;
   scanning, by the wireless router, channel quality of each wireless channel;
   selecting, by the wireless router, a first channel of the wireless router according to the channel quality of each wireless channel obtained by the scanning;
   storing, by the wireless router, identification information of the first channel;
   restarting, by the wireless router, a wireless connection module: wherein the restarting, by the wireless router, the wireless connection module further comprises:
      powering off the wireless connection module for a predetermined time interval,
      re-energize the wireless connection module after the predetermined time interval, and
      setting a working channel based on the stored identification information of the first channel; and implementing information exchange with a mobile device according to the working channel after the wireless connection module is restarted.

9. The electronic device according to claim 8, wherein the wireless connection module comprises a WiFi module.

10. The electronic device according to claim 8, wherein the processor is further configured to perform:
the wireless router periodically testing a channel quality of the working channel, and sending an optimum wireless channel selection request to the controller when the channel quality of the working channel is lower than a predetermined threshold of channel quality.

11. The electronic device according to claim 10, wherein the testing the channel quality of the current working channel comprises:
monitoring whether the working channel of the wireless router is used as a working channel by another wireless router at the same time, monitoring a busy level of the working channel of the wireless router, and determining the channel quality of the working channel according to a monitored result.

12. The electronic device according to claim 11, wherein when the wireless connection module comprises the WiFi module, the monitoring a busy level of the current working channel of the wireless router comprises:
monitoring a time period allowable to send a WiFi message, a time period allowable to receive the WiFi message and a time period of an arrival a non-WiFi message for the current working channel of the wireless router, and determining the busy level of the working channel according to a proportion of the three time periods.

13. The electronic device according to claim 8, wherein the processor is further configured to perform:
when the wireless router receives a working channel test request transmitted from the controller, testing the channel quality of the current working channel, and transmitting obtained channel quality information of the working channel by testing to the controller.

14. The electronic device according to claim 8, wherein the wireless router scanning the channel quality of each wireless channel comprises:
monitor whether each wireless channel of the wireless router is used as a working channel by another wireless router, monitoring a busy level of each wireless channel, and determining the channel quality of each wireless channel according to the monitored result.

15. The electronic device according to claim 8, wherein the wireless router selecting a first channel of the wireless router according to the channel quality of each wireless channel obtained by the scanning comprises:
determining a wireless channel having optimum channel quality in the wireless router as the first channel of the wireless router.

16. The electronic device according to claim 8, wherein the processor is further configured to perform:
receiving a transmit power regulation command transmitted from a management device;
determining a target transmit power according to information carried in the transmit power regulation command and representing for the target transmit power;
modifying a current transmit power of the wireless router to the target transmit power, and transmitting wireless signal based on the modified current transmit power;
obtaining current RSSI information of each terminal device connected to the wireless router, and determining current wireless network signal strength information of each terminal device according to the current RSSI information of each terminal device; and
transmitting the current wireless network signal strength information to the management device, such that the management device exhibits the current wireless network signal strength of each terminal device to a user.

17. The electronic device according to claim 16, wherein:
when the wireless router receives a page request transmitted from the management device and a page corresponding to the page request contains the transmit power, obtaining the current RSSI information of each terminal device connected thereto, and determining current wireless network signal strength information of each terminal device according to the current RSSI information of each terminal device.

18. The electronic device according to claim 16, wherein the exhibiting the current wireless network signal strength of each terminal device to the user comprises: exhibiting the current wireless network signal strength of each terminal device in a graphic form to the user.

19. The electronic device according to claim 16, wherein the information carried in the transmit power regulation command and representing for the target transmit power comprises information representing for information of respective target transmit powers corresponding to different connected terminal devices; and
the modifying a current transmit power of the wireless router to the target transmit power, and transmitting wireless signal based on the modified current transmit power comprises: modifying the current transmit powers of the different connected terminal devices to the target transmit powers corresponding to the connected terminal devices.

20. A non-transitory computer readable medium, having computer programs stored thereon that, when executed by one or more processors of an electronic device, cause the electronic device to perform:
receiving, by a wireless router, a request for selecting an optimum wireless channel transmitted from a controller;
scanning, by the wireless router, channel quality of each wireless channel;
selecting, by the wireless router, a first channel of the wireless router according to the channel quality of each wireless channel obtained by the scanning;
storing, by the wireless router, identification information of the first channel;
restarting, by the wireless router, a wireless connection module; wherein the restarting, by the wireless router, the wireless connection module further comprises:
powering off the wireless connection module for a predetermined time interval,
re-energize the wireless connection module after the predetermined time interval, and
setting a working channel based on the stored identification information of the first channel; and
implementing information exchange with a mobile device according to the working channel, wherein the working channel is the first channel.

* * * * *